United States Patent [19]

Steven et al.

[11] 4,246,783
[45] Jan. 27, 1981

[54] SPRING-FORCE MEASURING DEVICE

[75] Inventors: Josef Steven, Neunkirchen; Helmut Bezold, Erlangen, both of Fed. Rep. of Germany

[73] Assignee: Kraftwerk Union Aktiengesellschaft, Mulheim, Fed. Rep. of Germany

[21] Appl. No.: 957,425

[22] Filed: Nov. 2, 1978

[30] Foreign Application Priority Data

Nov. 8, 1977 [DE] Fed. Rep. of Germany ....... 2749998

[51] Int. Cl.$^3$ ...................... G21C 19/00; G01M 19/00
[52] U.S. Cl. .................................. 73/161; 176/19 R; 176/80
[58] Field of Search ................. 73/161, 141 A; 338/5; 176/19 R, 78, 80

[56] References Cited

U.S. PATENT DOCUMENTS

| | | | |
|---|---|---|---|
| 3,327,270 | 6/1967 | Garrison | 338/5 |
| 3,388,590 | 6/1968 | Dryden | 73/774 |
| 3,944,467 | 3/1976 | Biermann | 176/78 |
| 3,969,935 | 7/1976 | Shoberg | 338/5 |

Primary Examiner—Gerald Goldberg
Assistant Examiner—Denis E. Corr
Attorney, Agent, or Firm—Herbert L. Lerner

[57] ABSTRACT

Device for measuring the spring-force of resilient spacer projections set into spacer grids of nuclear reactor fuel assemblies to push fuel rods surrounded by spacer meshes against at least two oppositely disposed rigid spacer projections, including a force measuring plug having a diameter equal to the diameter of a fuel rod to be fixed in the spacer grid, and a flexible beam integral with the force measuring plug, the flexible beam having a free end in contact with a first resilient spacer projection to be measured, and another end firmly connected to the force measuring plug and having at least one wire strain gage disposed thereon.

3 Claims, 3 Drawing Figures

SPRING-FORCE MEASURING DEVICE

The invention relates to a measuring device for determining and checking the spring force of the resilient spacer projections that are set into spacer grids for nuclear reactor fuel assemblies and which push the fuel rods surrounded by each spacer mesh against, usually, two oppositely disposed rigid spacer projections. Nuclear reactor fuel assemblies generally include a multiplicity of fuel rods disposed parallel to each other which are held at the desired nominal distance from each other by spacer grids. These spacer grids, in turn, are normally constructed from crossed sheet metal webs. The meshes formed thereby surround one fuel rod each. For centering this fuel rod, resilient and rigid contact projections are provided in the respective mesh, where normally, as seen in the axial direction of the fuel rod, a resilient contact projection in one spacer wall is disposed opposite two rigid contact projections in the spacer wall parallel thereto. This method of centering not only permits easy insertion of the fuel rods into the spacer meshes but, during the operation of the reactor, also ensures maximum freedom from vibration of the fuel rods, around which the reactor coolant flows with high velocity. The resilient contact projections are of particular importance here. Their spring force, in addition to the accuracy of the physical dimensions, must be constant within narrow tolerances, so that the above-mentioned functions of the spacer grid remain assured, particularly with respect to the vibration behavior.

The problem therefore arose to overcome the disadvantages associated with the previously used inaccurate and difficult to use measuring methods and to find a simple-to-operate measuring device to be used, on the one hand, during the manufacture of the spacer grids and, on the other hand, for checking spacer grids already subjected to reactor operation, which allows measurement and checking of the spring force of the resilient contact projections.

It is therefore an object of the invention to provide a spring-force measuring device which overcomes the hereinaforementioned disadvantages of the heretofore known devices of this general type.

With the foregoing and other objects in view, there is provided, in accordance with the invention, a device for measuring the spring-force of resilient spacer projections set into spacer grids of nuclear reactor fuel assemblies to push fuel rods surrounded by spacer meshes against at least two oppositely disposed rigid spacer projections, comprising a force measuring plug having a diameter equal to the diameter of a fuel rod to be fixed in the spacer grid, and a flexible beam integral with the force measuring plug, the flexible beam, having a free end in contact with a first resilient spacer projection to be measured, and another end firmly connected to the force measuring plug and having at least one wire strain gage disposed thereon.

In accordance with another feature of the invention, the flexible beam is formed by a stress-free slot formed in the force measuring plug.

In accordance with a further feature of the invention, a second resilient spacer projection is disposed at a 10° shift from the first resilient spacer projection in the spacer grid, said slot forming the flexible beam being formed step-like whereby the second resilient spacer projection contacts the force measuring plug and not the flexible beam.

In accordance with a concomitant feature of the invention, the force measuring plug is hollow and has a lateral hole formed therein, the other end of the flexible beam being centered within the hollow force measuring plug, and including a pin disposed on the free end of the flexible arm extending radially through the lateral hole, the pin having a rounded end contactable with the first resilient spacer projection.

Other features which are considered as characteristic for the invention are set forth in the appended claims.

Although the invention is illustrated and described herein as embodied in a spring-force measuring device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
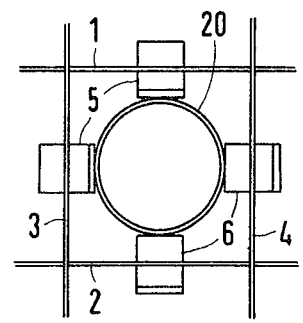
FIG. 1 is a diagrammatic top plan view of a spacer mesh of a spacer for the spring-force measuring device of the invention.

Referring now to the figures of the drawing and first, particularly to FIG. 1 thereof, it is seen that a spacer mesh of a spacer includes walls 1, 2, 3 and 4, which represent sections of crossed, upright webs. In these mesh walls are disposed resilient contact projections 5 as well as rigid contact projections 6. There is further shown the position of a fuel rod 20, which rests against the rigid contact projections 6 and slightly deforms the resilient contact projections 5, elastically.

To ensure operationally secure clamping of the fuel rods 20 in the spacer meshes, the resilient contact projections 5 must supply definite contact pressures. In the conventional devices used up to now, the spring forces have been checked by indirect measurement and the clearance between the springs and the rigid contact projections (inscribed mesh diameter) was determined by limit or go-no go plug gages. The permissible range of this clearance was determined empirically. It was found, however, that this testing method is too inaccurate and is inherently full of uncertainties. Thus, the spread of the spring forces is not determined, the measurement of the clearance depends on the inspector and the spring force actually present cannot be determined; only its range of force can be given.

Figure 2:
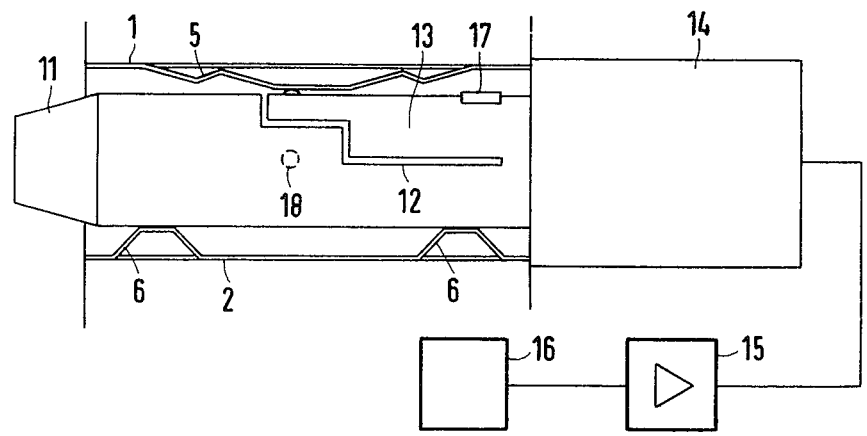
FIG. 2 is an axial cross-sectional view through a spacer mesh.
Figure 3:
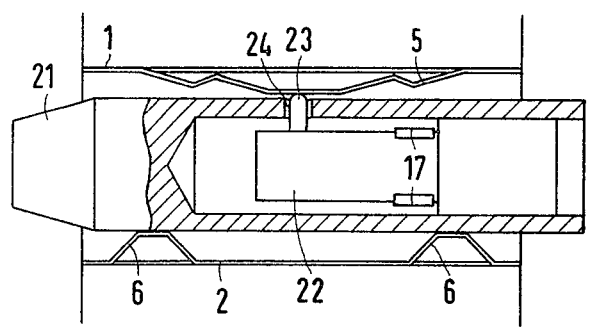
FIG. 3 is a simplified view similar to FIG. 2 of another embodiment of the invention, partly in section.

The measuring device according to the invention, which is shown in the embodiment examples of FIGS. 2 and 3, serves for measuring these spring forces and thereby, the spring characteristic as well.

The embodiment of FIG. 2 has no friction-dependent, mechanically movable parts. In addition, it is small and handy and can be handled separately from the indicating device. This device therefore also has little weight, so that from this aspect as well, interference with the measurement results is avoided. An added advantage is that this device can be placed into the spacer grid in any position, i.e., in the vertical position as well, so that canting the meauring device in the spacer mesh due to its own weight is therefore impossible.

In FIG. 2, two rigid contact projections 6 are attached to the mesh wall 2 and a resilient contact projection 5 is attached to the mesh wall 1. For measuring the spring force of the projection 5, the measuring device includes a ground plug 11, the diameter of which corresponds exactly to that of the fuel rods 20 which are to be inserted into the spacer meshed.

This plug is further provided with a slot 12 as in FIG. 2, for instance, by electron-beam machining or spark erosion, so that a flexible beam 13 remains. At the transition to the solid part of the plug 11, this flexible beam 13 is provided with at least one wire strain gage 17 which is connected through an amplifier 15 to a suitable indicating device 16. This, however, is within the state of the art, so that details are not shown for the sake of clarity. The plug 11 is fastened to a heat-insulating handle 14 which serves simultaneously, as shown, as a stop against the spacer grid, so that the point of contact between the spring or resilient contact projection 5 and the flexible beam 13 is thereby always accurately fixed. The slotting 12 of this flexible beam 13 is formed so that the contact point 18 of a resilient contact projection 5, not shown, which is shifted 90° in the spacer mesh, comes to lie on the solid part of the plug 11 and therefore cannot falsify the indication. The measurement principle of this device is based on the fact that due to the contact of the resilient projections 5 with the flexible beam 13, the latter is slightly bent, This bend is in turn picked up electrically by the wire strain gage 17 and is made visible at the indicating device 16 through the amplifier 15 and an interposed conventional measuring bridge, not shown.

The calibration of this device is very simple, since only the flexible beam 13 needs to be loaded with known forces at the contact point with the resilient contact projection 5. It has been found that this measuring device permits very reliable operation, and the measuring of the individual springs in the spacer meshes is accomplished very quickly. Since the handle 14 of the plug 11, through which the measuring leads are also brought out, is constructed as heat insulation, no falsification of the measured values through heat transfer from the operator to the measuring device proper is possible either.

Since the plug 11 must always have the same diameter as the fuel rods 20 being used, it is necessary to have plugs 11 with the proper dimensions available for measuring different spacer geometries. These plugs can be made so that they are exchangeable in the handle 14 and with respect to the electronic evaluator by means of a mechanical coupling.

Contrary to FIG. 2, the embodiment example according to FIG. 3 shows a hollow plug 21, in the interior of which the flexible beam 22 is fastened at one end. Wire strain gages 17 are again attached in the vicinity of this fastening point and the measuring lines are brought out through the non-illustrated handle which is similar to the handle 14 shown in FIG. 2.

A radial pin 23 which protrudes to the outside through a hole 24 in the plug 21 is attached to the free end of this flexible beam 22 for making contact with the resilient projection 5.

This embodiment is better protected against external influences than that according to FIG. 2. It can also be sealed, for instance, by means of an elastic rubber substance, so that it can also be used, for instance, under water.

To further illustrate this device, it should be mentioned that the plug 11 or 21, respectively, has a diameter in the order of 10 mm, corresponding to the diameter of the fuel rods. The flexure of the flexible beam 13 or 22, respectively, at the point where the spring makes contact is in the order of 16 $\mu$m. Instead of the wire strain gages, other force transducers can, of course, also be used, such as the piezoelectric type, for example.

In conclusion, it should be mentioned that a measuring device of this kind can be used in all spacer types in which springs serve for centering fuel rods. The plugs 11 and 21, respectively, then only need to be adapted to the respective spacer geometry. Such measuring devices of course, can logically also be used for measuring the spring force in other equipment outside the field of nuclear power plant engineering, where a simple and reliable control of resilient parts is likewise required.

There are claimed:

1. Handheld device for measuring the spring-force of resilient spacer projections set into spacer grids of nuclear reactor fuel assemblies to push fuel rods surrounded by spacer meshes against at least two oppositely disposed rigid spacer projections, comprising a force measuring plug having a diameter equal to the diameter of a fuel rod to be fixed in the spacer grid, and a flexible beam integral with said force measuring plug, said flexible beam having a free end in contact with a first resilient spacer projection to be measured, and another end firmly connected to said force measuring plug and having at least one wire strain gage disposed thereon, said flexible beam being formed by a stress-free slot formed in said force measuring plug.

2. Device according to claim 1, wherein a second resilient spacer projection is disposed at a 90° shift from the first resilient spacer projection in the spacer grid, said slot forming said flexible beam being formed steplike whereby said second resilient spacer projection contacts said force measuring plug exclusively.

3. Hand-held device for measuring the spring-force of resilient spacer projections set into spacer grids of nuclear reactor fuel assemblies to push fuel rods surrounded by spacer meshes against at least two oppositely disposed rigid spacer projections, comprising a force measuring plug having a diameter equal to the diameter of a fuel rod to be fixed in the spacer grid, and a flexible beam integral with said force measuring plug, said flexible beam having a free end in contact with a first resilient spacer projection to be measured, and another end firmly connected to said force measuring plug and having at least one wire strain gage disposed thereon, said force measuring plug being hollow and having a lateral hole formed therein, said other end of said flexible beam being centered within said hollow force measuring plug, and including a pin disposed on said free end of said flexible beam extending radially through said lateral hole, said pin having a rounded end contactable with said first resilient spacer projection.

\* \* \* \* \*